United States Patent [19]
Tan et al.

[11] Patent Number: 5,247,057
[45] Date of Patent: Sep. 21, 1993

[54] INSITU MOLECULAR COMPOSITES BASED ON RIGID-ROD POLYIMIDES

[75] Inventors: Loon-Seng Tan; Fred E. Arnold, both of Centerville, Ohio

[73] Assignee: The United States of America as represented by the Secretary of the Air Force, Wright-Patterson Air Force Base, Ohio

[21] Appl. No.: 854,732

[22] Filed: Mar. 23, 1992

[51] Int. Cl.$^5$ .................. C08G 69/26; C08G 73/10
[52] U.S. Cl. .................................. 528/353; 528/170; 528/171; 528/172; 528/173; 528/176; 528/183; 528/184; 528/188; 528/190; 528/205; 528/208; 528/218; 528/220; 528/229; 528/337; 525/183; 525/425
[58] Field of Search ............... 528/337, 353, 170-173, 528/176, 183-184, 188, 205, 190, 208, 218, 220, 229; 525/425, 183

[56] References Cited

U.S. PATENT DOCUMENTS

| | | | |
|---|---|---|---|
| 4,207,407 | 6/1980 | Helminiak | 525/425 |
| 4,377,546 | 3/1983 | Helminiak | 525/425 |
| 4,977,223 | 12/1990 | Arnold et al. | 525/432 |
| 5,021,517 | 6/1991 | Wang et al. | 525/432 |
| 5,086,120 | 2/1992 | Tan et al. | 525/432 |

OTHER PUBLICATIONS

Polymer Preprints, vol. 28, No. 2, Aug. 1987, "In situ Rigid-Rod Aromatic Polyimides," Wallace, et al, pp. 316-317.
CA 110(14):115893a.
CA 110(18):155261z.
CA 114(8):62880t.

*Primary Examiner*—John Kight, III
*Assistant Examiner*—P. Hampton-Hightower
*Attorney, Agent, or Firm*—Charles E. Bricker; Thomas L. Kundert

[57] ABSTRACT

A polymer which can undergo thermally-induced transformation to provide a reinforcing component and a matrix component. This polymer has repeating units of the formula:

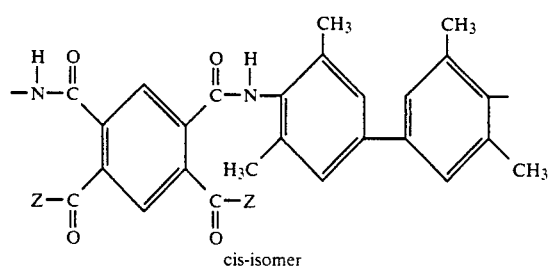

cis-isomer

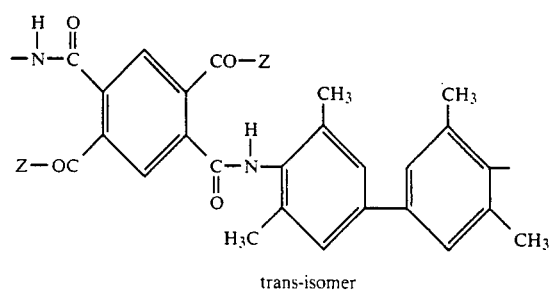

trans-isomer wherein Z is selected from the group consisting of dialkyl amino thermoplastic moieties and dialkyl amino moieties which can undergo insitu reaction to form a thermoset. Dialkyl amino moieties which can undergo insitu reaction to form thermosets include the following:

—NRQ and

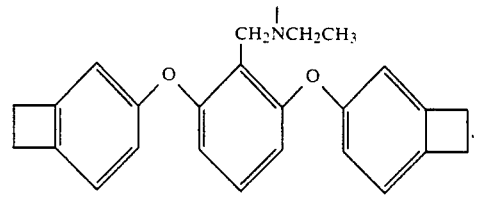

wherein Q is (Abstract continued on next page.)

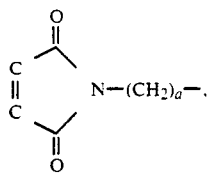
R is —CH₃ or Q and a has a value of 1 to 3. Dialkyl amino thermoplastic moieties include the following:
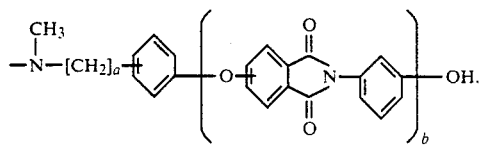
-continued
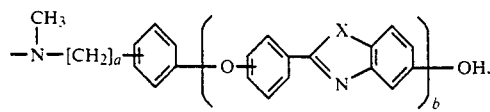
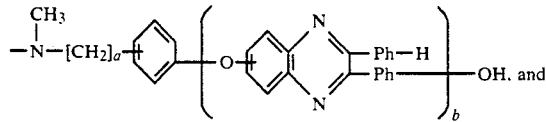
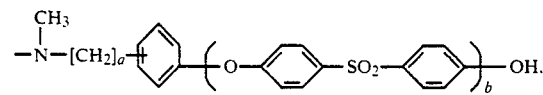
wherein a has a value of 1 to 3, b has a value of 5 to 100, X is —S—, —O—, or —NH— and Ph is phenylene.
3 Claims, No Drawings

INSITU MOLECULAR COMPOSITES BASED ON RIGID-ROD POLYIMIDES

RIGHTS OF THE GOVERNMENT

The invention described herein may be manufactured and used by or for the Government of the United States for all governmental purposes without the payment of any royalty.

BACKGROUND OF THE INVENTION

This invention relates to composite polymeric materials, particularly composite materials containing rod-like aromatic heterocyclic polymers dispersed in a polymeric matrix.

Chopped fiber reinforced plastics are currently being used in the fabrication of a wide variety of components. There are several disadvantages in the use of fiber for the reinforcement of plastic. In the case of chopped glass fibers, a large amount of fiber, generally a minimum of 30 percent by weight, is necessary for reinforcement because of the low reinforcing effect of the fiber. There is a practical processing limit on the effective fiber length. A macroscopically long fiber length is required with due regard for breaking or destruction of the fiber during processing, particularly molding. Composite materials containing chopped fibers are generally less processable than their non-reinforced counterparts. The shape of moldings is often limited to simple block or sheet forms. Films or filaments cannot be formed from chopped glass fiber-reinforced plastics. Other disadvantages of these materials include poor surface properties of molded articles, an anisotropy in dynamic properties, molding defects due to heterogeneity of the polymeric materials, and low cycle time in processing.

A need exists for high strength reinforced composites and a method for their manufacture which possess at least the following desirable prerequisites: (1) non-reliance on fiber reinforcement for the attainment of high strength properties; (2) circumvention of the complexities of current composite fabrication procedures; and (3) elimination of any possibility of fiber-polymer interface problems.

Various attempts have been made to overcome some of the above-described disadvantages of chopped-fiber reinforced plastics. One approach described by Helminiak et at., U.S. Pat. Nos. 4,207,407 and 4,377,546, comprises the dispersion of an intrinsically rigid rod-like heterocyclic polymer in a flexible, coil-like heterocyclic polymer.

The above composites are referred to as molecular composites. While this approach represents a valuable contribution to the art, it has certain drawbacks. For example, poly(p-phenylene benzobisthiazole) (PBT) has superior mechanical properties and thermal stability. However, PBT degrades before it melts; therefore, processing of a composite containing PBT must be carried out in a solution state with an acid, such as methanesulfonic acid (MSA), as the solvent. Relatively few flexible coil polymers can be dissolved in or are stable in MSA, thus limiting the choice of matrix polymers. Molecular composites based on PBT and poly-2,5-benzimidazole (ABPBI) have been fabricated into fibers and thin films. However, ABPBI does not have a glass transition temperature ($T_g$). Therefore, molecular composites containing ABPBI are difficult to thermally consolidate into thicker specimens. To overcome this problem, thermoplastic matrices have been used so that the molecular composite films could be laminated. However, thicker specimens fabricated using thermoplastic matrices are limited to use at temperatures below the $T_g$ of the matrix polymer(s). Conventional thermoset resins, such as bismaleimides, epoxies and the like, are not stable in the acid medium used to process the rigid-rod polymer, and cannot be used as host matrices for molecular composites.

A drawback to molecular composites based upon rod-like and coil-like aromatic heterocyclic polymers has to do with phase separation between the two polymers. Such separation can occur during coagulation/precipitation and/or during consolidation. During coagulation/precipitation the polymers can separate due to insufficient entanglement on the part of the coil-like polymer, lack of strong rod-coil specific interaction or differences in rates of coagulation. Phase separation can also be thermally induced during consolidation.

One solution to the problem of phase separation is provided by Tan et al, U.S. Pat. No. 5,086,120 which discloses a molecular composite system consisting essentially of a para-oriented benzobisazole polymer and poly(2-acrylamido-2-methylpropanesulfonic acid). This molecular composite system can be processed into fibers and films with little or no detactable phase separation.

A drawback to molecular composites based upon rod-like aromatic heterocyclic polymers and thermoplastic or thermosetting resins has to do with the propensity of the rod-like materials to agglomerate. Serious agglomeration can lead to structural failure. Minor agglomeration can often be accommodated. What is desired is a molecular composite system in which there is interaction between the matrix polymer and the rod-like polymer sufficient to overcome any tendency toward phase separation.

Accordingly, it is an object of this invention to provide a novel molecular composite system.

Other objects, aspects and advantages of the present invention will become apparent to those skilled in the art from a reading of the following detailed description of the invention.

SUMMARY OF THE INVENTION

In accordance with the present invention, there is provided a polymer which can undergo thermally-induced transformation to provide a reinforcing component and a matrix component. The polymer of this invention has repeating units of the formula:

A.

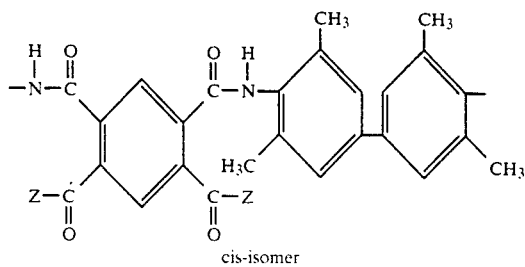

cis-isomer

B.

-continued

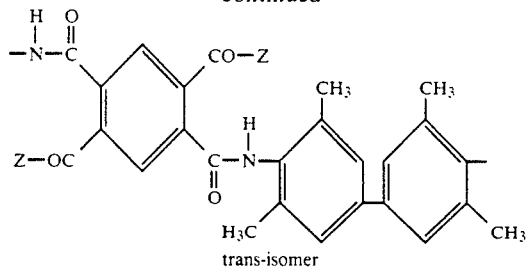
trans-isomer wherein Z is selected from the group consisting of dialkyl amino thermoplastic moieties and dialkyl amino moieties which can undergo insitu reaction to form a thermoset.

Dialkyl amino moieties which can undergo insitu reaction to form thermosets include the following:

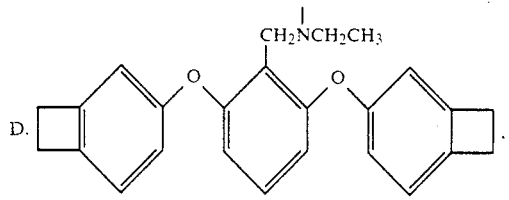

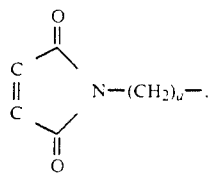

wherein Q is

R is —CH$_3$ or Q and a has a value of 1 to 3.

Dialkyl amino thermoplastic moieties include the following:

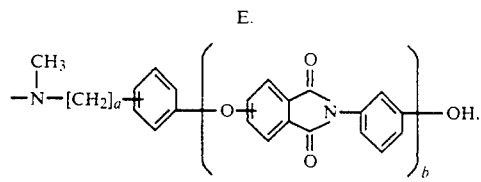

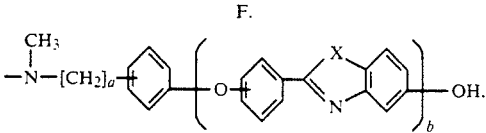

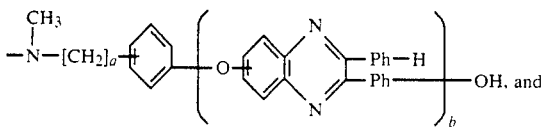

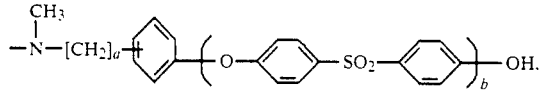

wherein a has a value of 1 to 3, b has a value of 5 to 100, X is —S—, —O— or —NH— and Ph is phenylene.

The polymer of this invention is prepared as shown in the following sequence of reactions. For convenience, only the trans-isomer is shown:

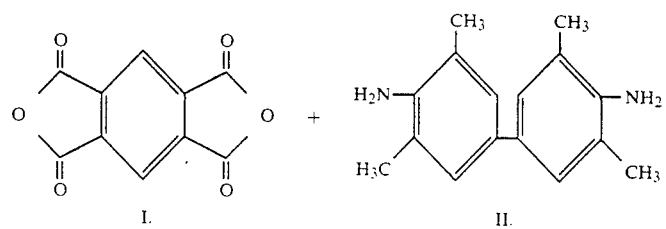

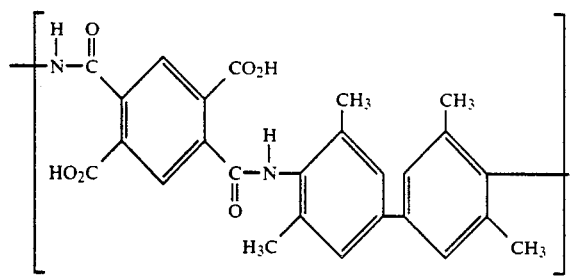

III.

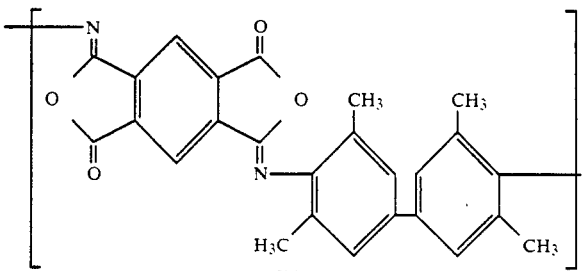

IV.

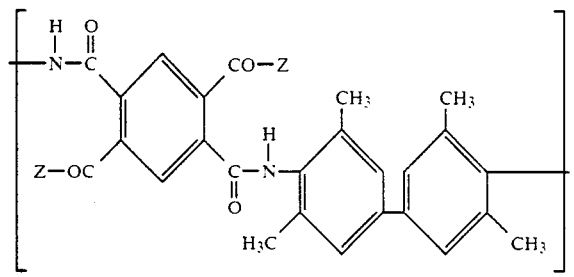

V.

In the first step of the reaction sequence, pyromellitic dianhydride (I) is reacted with tetramethyl benzidine (II) in a suitable solvent, such as dimethyl acetamide (DMAC), at room temperature under an inert atmosphere, such as $N_2$, to prepare the corresponding polyamic acid (III). Aliquots may be taken at suitable intervals to determine the degree of polymerization. The reaction mixture is then diluted with additional solvent and a dehydrating agent, such as, for example, 1,3-dicyclohexylcarbodiimide (DCC), is added to the mixture in one portion. The resulting reaction mixture is stirred for 4 to 24 hours at room temperature under an inert atmosphere to ensure substantial conversion of the polyamic acid to the polyisoimide (IV). The polyisoimide is then reacted with the dialkyl amine, H—Z, wherein Z is as previously defined, to provide the poly-(amic dialkylamine) (V) of this invention. Polymer V is believed to be a mixture of the cis- and trans-isomers (A and B).

Polymer V is what may be called a precursor polymer. When heated to a suitable temperature, it undergoes imidization to provide the rigid rod polymer poly(4,4'-biphenyl pyromellitimide):

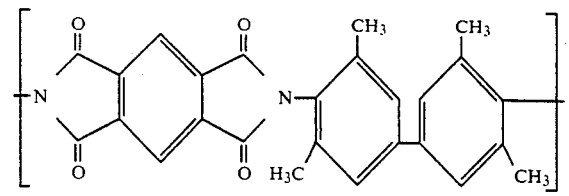

and 2 Z moieties per repeating unit. These Z moieties are mono-amine-terminated thermoplastic/plasticizer units or contain reactive groups which can undergo insitu addition reaction to form a thermoset matrix.

Where the dialkyl amino moiety Z is the structure C, the reactant Z—H is

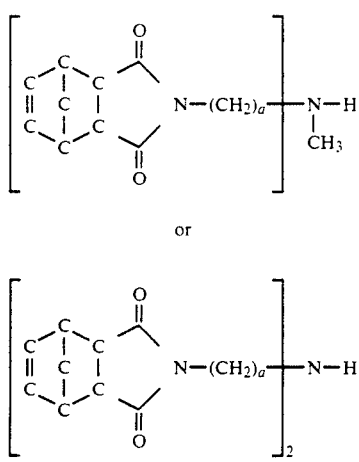

or wherein a is as defined previously. Following formation of the polymer V, the precursor polymer is heated in a suitable solvent, such as dimethyl acetamide, to about 180° to 200° C. to deprotect the maleimide function. The liberated cyclopentadiene may be removed under vacuum during heating. Alternatively, the precursor polymer may be heated to a suitable temperature under a pressure of at least about 250 psi, in which case the eliminated cyclopentadiene will remain in the matrix.

As stated previously, the precursor polymer is converted to poly(4,4'-biphenyl pyromellitimide) and a thermoset or a thermoplastic/plasticizer by heating to a suitable temperature. Where, as above, the dialkyl amino moiety Z is the structure C, the onset of this conversion is about 243° C.; where the moiety Z is the structure D, the onset of conversion is about 230° C. These two structures provide thermoset matrices. When the moiety Z is a thermoplastic moiety, the onset of conversion is about 225° to 275° C.

As one example of a thermoset, the structure C wherein the moiety R is $CH_3$ provides a polymer having repeating units of the formula:

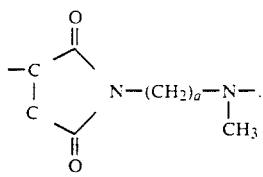

Preparation of the dialkyl amino moieties which can undergo insitu reaction to form thermosets is described in the Examples which follow.

With regard to the thermoplastic moieties E–H, the phrase "thermoplastic/plasticizer" has been used. Those skilled in the art will recognize that whether the structure functions as a thermoplastic or as a plasticizer is primarily dependent on the degree of polymerization, b. Generally, when b is in the range of about 10 to 50, these materials will function as plasticizers; when b is greater than about 50 these materials will function as thermoplastics.

The thermoplastic moieties may be prepared as shown by the following exemplary reaction. For convenience, only the preparation of the polysulfone is shown:

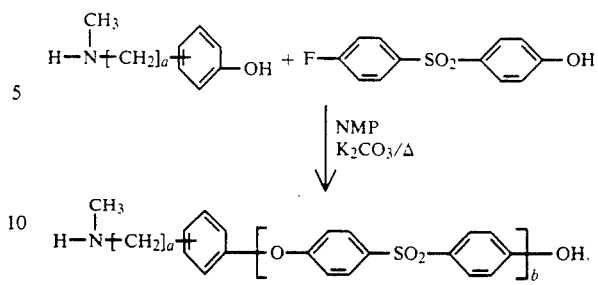

The following examples illustrate the invention.

EXAMPLE I

Preparation of iminobis(N-propylnadic imide) (DNI-3A)

9.00 g (54.82 mmol) of nadic anhydride (cis-5-norbornene-endo-2,3-dicarboxylic anhydride) was dissolved in 60 ml of chloroform in a 250 ml round-bottomed flask. 3.5 g (26.65 mmol) of 3,3'-iminobispropylamie was mixed with 40 ml of chloroform in a pressure-equalizing addition funnel. The latter solution was added dropwise to the nadic anhydride/chloroform solution with rapid stirring over a period of 30 minutes. A white precipitate formed with a slight exotherm. After addition was complete, the addition funnel was replaced with a reflux condenser and the mixture was heated to reflux. The reaction mixture was refluxed overnight. After cooling to room temperature, the mixture was poured into a separation funnel containing 300 ml distilled water. The bottom layer was collected and dried over anhydrous $MgSO_4$. Solvent was removed from the crude product by rotary evaporation. The product was dried in vacuo at 50° C. for 30 hours. Yield, 10.0 g (89%). Analysis calculated for $C_{24}H_{29}N_3O_4$: C, 68.06; H, 6.90; N, 9.92. Found: C, 67.98; H, 6.87; N, 9.80.

EXAMPLE II

Preparation of N-ethyl-(2,6-di-benzocyclobutenoxy) benzylamine (EBA-BCB)
2,6-di-(4-benzocyclobutenoxy)benzonitrile 3.85 g (27.68 mmol) of 2,6-difluorobenzonitrile, 8.00 g (57.88 mmol) anhydrous potassium carbonate and 7.50 g (62.42 mmol) 4-hyroxybenzocyclobutene were placed in a 250 ml, 3-necked round-bottomed flask equipped with a Dean-Stark trap, reflux condensor, nitrogen adapter, overhead mechanical stirrer and a thermometer adapter. To this mixture were added 120 ml of N-methylpyrrolidinone (NMP) and 80 ml dry toluene. The resulting reaction mixture was stirred vigorously and heated rapidly in an oil bath under a nitrogen blanket. The internal temperature of the reaction mixture was maintained at about 120° C. for 48 hours. The resulting mixture was dark with a precipitated solid forming a ring on the walls of the flask just above the surface of the solution.

After the reaction mixture had cooled to room temperature, it was filtered and the reaction vessel was rinsed with methylene chloride. The combined filtrate was transferred to a 500 ml round-bottomed flask and subjected to rotary evaporation to remove the methylene chloride and toluene. The remaining dark liquid was poured into a stirred, cold aqueous HCl solution (100 ml conc. HCl + 1400 ml distilled water). A brown precipitate formed. This precipitate was allowed to stand at room temperature for several hours, then collected by vacuum filtration and washed with water until the filtrate was neutral to litmus paper. The crude produce was air-dried under suction overnight, then redissolved in about 200 ml of methylene chloride. The resulting solution was dried over anhydrous $MgSO_4$ and filtered. The filtrate was subjected to rotary evaporation. After the volume of filtrate had been reduced to about 50 ml, 100 ml of hexane was added. Rotary evaporation was continued to completely remove the solvents. About 9.15 g of crude product was obtained.

The crude product was dissolved in about 100 ml of ethyl acetate and the resulting solution was passed through a silica gel column, eluting with 1:4 ethyl acetate/hexane. The first fraction was collected and complete removal of the solvent via rotary evaporation led to the isolation of the desired product. Yield: 8.70 g (93%).

Analysis calculated for $C_{23}H_{17}NO_2$: C, 81.39; H, 5.05; N, 4.14. Found: C, 80.88; H, 5.14; N, 3.90.

Mass Spectral Analysis: $M^+ = 339$ (relative abundance of 19.25%).

IR (KBr, band frequency in $cm^{-1}$): 2830 w, 2868 vw, (CH stretch); 2228 m (C≡N stretch); 1215 vs (Ar—O—Ar stretch).

$^1$HNMR ($CDCl_3$. $\delta$ in ppm, TMS as internal standard):

2,6-di-(4-benzocyclobutenoxy)benzylamine: In a 500 ml, 4-necked round-bottomed flask equipped with an overhead mechanical stirrer, a thermometer/adaptor, a reflux condensor and a funnel was added 2,6-di-(4-benzocyclobutenoxy)benzonitrile followed by 260 ml of anhydrous diethyl ether. The resultant mixture was placed in an ice bath and stirred under a nitrogen atmosphere. When the internal temperature reached 0° C., lithium aluminum hydride was added through the attached funnel in 3 portions (0.69 g, 0.96 g, 0.50 g), each addition followed by washing the funnel with about 10 ml $Et_2O$, over a period of 15 minutes. The resulting mixture was stirred at 0° C. for 20 minutes, then the ice bath was removed and the mixture was allowed to warm to room temperature. The reaction mixture was then refluxed gently for 17 hours.

The reaction mixture was then chilled in an ice bath, then quenched with 5 ml of distilled water, 2.5 ml 20% NaOH and 16 ml distilled water. Internal temperature was maintained at 0° to 5° C. during quenching. The ice bath was removed and the mixture was allowed to warm to room temperature. The mixture was filtered and the residue was washed with $Et_2O$. About 400 ml of greenish yellow filtrate was dried over anhydrous $MgSO_4$, then gravity filtered into a flask. Removal of the ether yielded 7.25 g (97%) of a viscous amber liquid.

Analysis calculated for $C_{23}H_{21}NO_2$: C, 80.44; H, 6.16; N, 4.08. Found: C, 79.77; H, 6.08, N, 3.92.

Mass Spectral Analysis: $M^+ = 343$ (relative abundance of 16.68%); $(M-NH_3)^+ = 326$ (relative abundance of 100%).

IR (KBr, band frequency in $cm^{-1}$): 3383 vw, 3296 ($NH_2$ stretches); 3013 w, 3049 w, 3074 w (aromatic CH stretches); 2830 m, 2864 m, 2925 s, 2964 ms (aliphatic CH stretches); 1236 vs, 1221 vs (Ar—O—Ar stretches).

$^1$HNMR ($CDCl_3$. $\delta$ in ppm, TMS as internal standard): 1.70 (singlet, 2H, $NH_2$), 3.18 (singlet, 8H, alicyclic protons), 3.99 (singlet, 2H, benzyl protons), 6.57-7.58 (multiplets, 9H, aromatic protons).

N-[2,6-di-(4-benzocyclobutenoxy)]benzyl acetamide: 7.00 g (20.38 mmol) of 2,6-di-(4-benzocyclobutenoxy)benzylamine and 60 ml chloroform were placed in a 250 ml round-bottomed flask. To the resulting amber solution was added, in portions and at room temperature, a solution of 2.60 g (25.47 mmol) acetic anhydride, 2.02 g (25.57 mmol) pyridine and 10 ml chloroform. The reaction was instantaneous and exothermic, as evidenced by self-refluxing of the chloroform. After completion of the addition, the solution was gently refluxed overnight. The reaction mixture was poured into a 1 l separatory funnel containing 350 ml distilled water. After shaking the mixture vigorously, the chloroform (bottom) layer was collected. The chloroform layer was washed twice more, then collected and dried over anhydrous $MgSO_4$. Removal of the chloroform yielded 7.70 g of off-white crude product. Recrystallization of the crude product from methanol/hexane (v/v, 1:25) yielded 6.20 g (79%).

Analysis calculated for $C_{25}H_{23}NO_3$: C, 77.90; H, 6.01; N, 3.63. Found: C, 77.26; h, 6.14; N, 3.29.

Mass Spectral Analysis: $M^+ = 385$ (relative abundance of 17.49%); $(M-CH_3CONH_2)^+ = 326$ (relative abundance of 96.09%).

IR (KBr, band frequency in $cm^{-1}$): 3281 s (NH stretch); 3060 w (aromatic CH stretches); 2826 w, 2930 m, 2975 m (aliphatic CH stretches); 1641 vs (amide carbonyl stretch); 1240 ms, 1227 v (Ar—O—Ar stretches).

$^1$HNMR ($CDCl_3$. $\delta$ in ppm, TMS as internal standard): 1.90 (singlet, 3H, $CH_3$), 3.20 (singlet, 8H, alicyclic protons), 4.69 (doublet, 2H, benzyl protons), 5.90 (broad, NH), 6.53-7.36 (multiplets, 9H, aromatic protons).

N-ethyl-(2,6-di-benzocyclobutenoxy)benzylamine: 5.50 g (14.27 mmol) of N-[2,6-di(4-benzocyclobutenoxy)]benzyl acetamide and 250 ml anhydrous diethyl ether were placed in a 500 ml, 4-necked round bottomed flask. The flask was placed in an ice bath and the mixture stirred under a $N_2$ atmosphere. When the internal temperature reached 0° C., $LiAlH_4$ was added in two portions, 0.73 g and 0.96 g. The resulting mixture was stirred at 0° C. for 20 minutes, then the ice bath was removed to allow the mixture to warm to room temperature. The reaction mixture was then refluxed for 17 hours.

The reaction mixture was chilled in an ice bath, then quenched, sequentially, with 3.5 ml distilled water, 1.65 ml 20% NaOH and 9 ml distilled water. The reaction mixture was maintained at 0° to 5° C. during quenching. The ice bath was removed to allow the mixture to warm to room temperature, then filtered. The filtrate was dried over anhydrous $MgSO_4$. The $Et_2O$ was removed by rotary evaporation. Product yield: 4.15 g (97%).

Analysis calculated for $C_{23}H_{25}NO_2$: C, 80.83; H, 6.78; N, 3.77. Found: C, 80.56; h, 6.76; N, 3.54.

Mass Spectral Analysis: $M^+ = 371$ (relative abundance of 47.12%); $(M-NHCH_2CH_3)^+ 327$ (relative abundance of 17.68%).

IR (KBr, band frequency in $cm^{-1}$): 3337 vw (NH stretch); 2828 ms, 2863 vw, 2926 ms, 2967 ms (CH stretch); 1227 vs (Ar—O—Ar stretch). $^1$NHMR ($CDCl_3$. $\delta$ in ppm, TMS as internal standard): 1.10 (triplet, 3H, $CH_3$), 1.96 (singlet, NH), 2.72 (quartet, 2H, $CH_2$), 3.17 (singlet, 8H, alicyclic protons), 3.99 (singlet, 2H, benzyl protons), 5.90 (broad, NH), 6.53-7.33 (multiplets, 9H, aromatic protons).

EXAMPLE III

Preparation poly(amic amide-DNI-3A)

2.4986 g (11.4551 mmol) pyromellitic dianhydride (PMDA) and 2.7543 g (11.4595 mmol) tetramethylbenzidine (TMB) were placed in a three-necked 500 ml round-bottom flask. 50.0 ml of dry dimethyl acetamide (DMAC) was added. Upon slow stirring, under $N_2$, the PMDA and TMB dissolved to form a light yellow solution of the poly(amic acid), whose viscosity gradually increased with time. After stirring for 17 hours at room temperature and under $N_2$, the resulting solution was very viscous, transparent and faint yellow. 100 ml of dry DMAC was added to dilute the solution. After stirring an additional 2 hours, a 2.0 ml aliquot of the solution was withdrawn and diluted with 20.0 ml of DMAC. The intrinsic viscosity of the poly(amic acid) was determined to be 2.09 dl/g at 30° C.

4.70 (22.78 mmol) of 1,3-dicyclohexylcarbodiimide (DCC) was added in one portion to the dilute poly(amic acid) solution. The reaction mixture changed color from light yellow to orange to wine-red within minutes, followed by precipitation of white crystalline by-product 1,3-dicyclohexylurea (DCU). After the polyisoimide solution had been stirred at room temperature for about 16-17 hours, a solution of 10.5 g (24.79 mmol) 3,3'-iminobis(N-propylnadic imide) (DNI-3A) in a mixture of about 20 ml dry tetrahydrofurna (THF) and 30 ml dry DMAC was added dropwise over a period of about 30 minutes. The final reaction mixture was stirred at room temperature, under $N_2$, for 18 hours, then filtered into a flask containing 1.4 l water.

The light yellow polymeric product formed a cake floating on the surface of the filtrate. This cake was collected by filtration, washed and air-dried, with suction, overnight. The crude product was extracted with methanol for 2 days, followed by vacuum drying at 90° C. for 2 days. Yield: 10.8 g. Intrinsic viscosity in DMAC at 30° C. was 2.21 dl/g.

Analysis calculated for $C_{74}H_{76}N_8O_4$: C, 70.01; H, 6.04; N, 8.83. Found: C, 68.06; H, 5.65; N, 8.88.

A DSC (Differential Scanning Calorimetry) scan of the polymer showed a very complex pattern of thermal transitions between 200° and 400° C. Thermogravimetry-Mass Spectroscopy (TG-MS) detected a large amount of cyclopentadiene at the early part of this temperature regime. When the DSC scan was performed under 750 psi of $N_2$, a polymerization endotherm was observed commencing at 243° C. and maximizing at 293° C. The volatilization of cyclopentadiene and, presumably, the dialkylamine was effectively inhibited.

EXAMPLE IV

Preparation of poly(amic amide EBA-BCB)

0.9716 g (4.4544 mmol) pyromellitic dianhydride (PMDA) and 1.0707 g (4.4547 mmol) tetramethylbenzidine (TMB) were placed in a three-necked 500 ml round-bottom flask. 15.0 ml of dry dimethyl acetamide (DMAC) was added. Upon slow stirring, under $N_2$, the PMDA and TMB dissolved to form a light yellow solution of the poly(amic acid), whose viscosity gradually increased with time. After stirring for 20 hours at room temperature and under $N_2$, the resulting solution was very viscous, transparent and faint yellow. 35 ml of dry DMAC was added to dilute the solution. 1.88 g (9.111 mmol) of 1,3-dicyclohexylcarbodiimide (DCC) was added in one portion to the diluted poly(amic acid) solution. The reaction mixture changed color from light yellow to orange to wine-red within minutes, followed by precipitation of white crystalline by-product 1,3-dicyclohexylurea (DCU). After the polyisoimide solution had been stirred at room temperature for about 16-17 hours, a solution of 3.40 g (9.15 mmol) of N-ethyl-(2,6-di-benzocyclobutenoxy) benzylamine (EBA-BCB) in 10 ml dry DMAC was added dropwise over a period of about 30 minutes. After about 3 ml of the solution had been added, the reaction mixture became drastically viscous and within minutes, gelation occurred. About 150 ml dry DMAC was added in an attempt to dissolve the gel, but to no avail. The remaining EBA-BCB/DMAC solution was rapidly added. The gel in the reaction mixture was broken into smaller pieces with the aid of a spatula. The final reaction mixture was stirred at room temperature, under $N_2$, for 5 days. To ensure complete reaction, the mixture was heated at 65°-70° C. under $N_2$ for 18 hours. Then it was poured into a beaker containing 1.4 l water.

The off-white polymer was washed with water and then with methanol, then collected by filtration. The crude product was extracted with methanol for 3 days, followed by vacuum drying at 100° C. for 2 days. Yield: 4.82 g.

A DSC (Differential Scanning Calorimetry) scan of the polymer showed a first exotherm with an onset at about 230° C. and a maximum at about 270° C. and a second exotherm having an onset temperature of about 353° C. and a maximum at 369° C. The first exotherm is ascribable to the ring opening of the benzocyclobutene (BCB) and the subsequent thermosetting reactions of the resulting reactive intermediate. The second exotherm is believed to be due to the thermal reaction of the stable aryl radical formed from the homolytic cleavage and loss of the aliphatic portion of EBA-BCB.

Various modifications may be made to the invention as described without departing from the spirit of the invention or the scope of the appended claims.

We claim:

1. A polymer which can undergo thermally-induced transformation to provide a reinforcing component and a matrix component, having repeating units of the formula selected from the group consisting of:

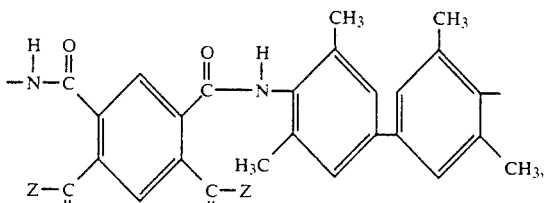

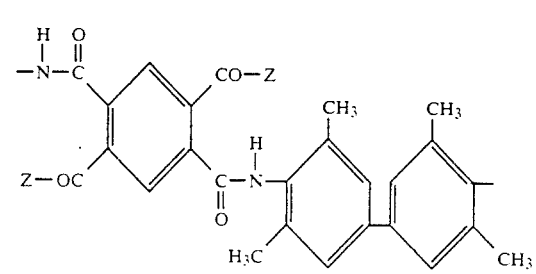

and mixtures thereof, wherein Z is selected from the group consisting of (a) dialkyl amino thermoplastic moieties and (b) dialkyl amino moieties which can undergo insitu reaction to form a thermoset;

wherein said dialkyl amino moiety (b) is selected from the group consisting of

—NRQ and

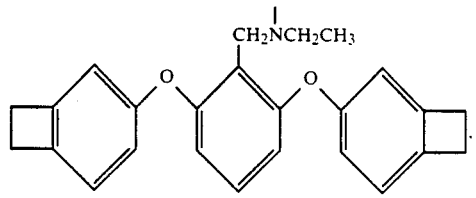

wherein Q is

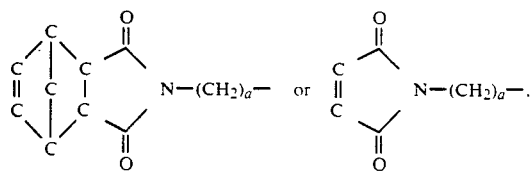

R is —CH₃ or Q, and a has a value of 1 to 3;
and wherein said dialkyl amino thermoplastic moiety (a) is selected from the group consisting of

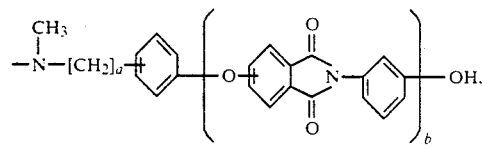

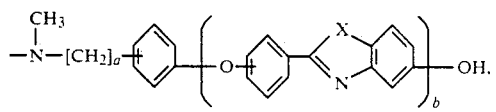

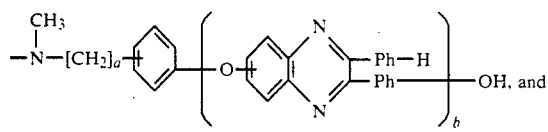

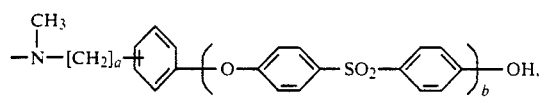

wherein a has a value of 1 to 3, b has a value of 5 to 100, X is —S—, —O— or —NH— and Ph is phenylene.

2. A method for preparing a polymer which can undergo thermally-induced transformation to provide a reinforcing component and a matrix component, said polymer having repeating units of the formula selected from the group consisting of:

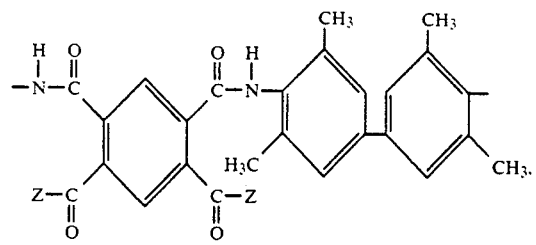

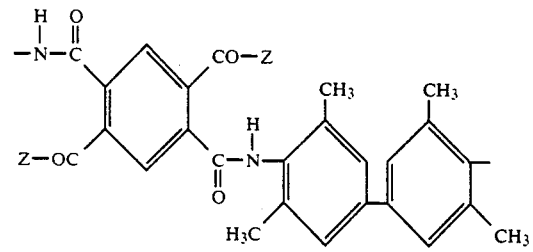

and mixtures thereof, wherein Z is selected from the group consisting of dialkyl amino thermoplastic moieties and dialkyl amino moieties which can undergo insitu reaction to form a thermoset;

which comprises reacting poly [4,4'-(3,3',5,5'-tetramethyl) benzidine benzobisisoimide] with a dialkyl amine selected from the group consisting of (a) dialkyl amino thermoplastic moieties and (b) dialkyl amino moieties which can undergo reaction to form a thermoset;

wherein said dialkyl amino moiety (b) is selected from the group consisting of H—NRQ and

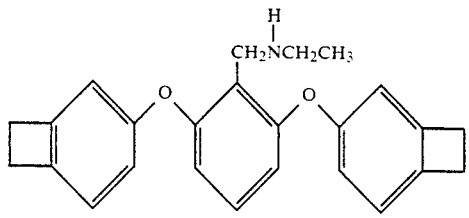

wherein Q is

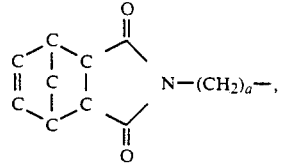

R is —CH₃ or Q, and a has a value of 1 to 3;
and wherein said dialkyl amino thermoplastic moiety (a) is selected from the group consisting of

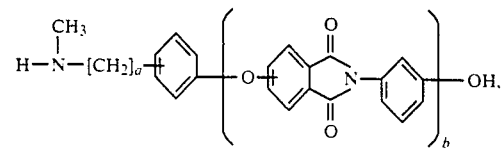

-continued
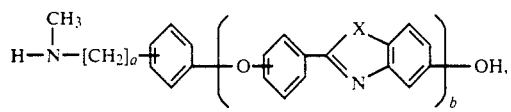
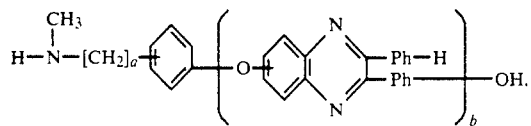
and
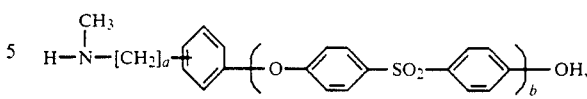
wherein a has a value of 1 to 3, b has a value of 5 to 100, X is —S—, —O— or —NH— and Ph is phenylene.
3. The method of claim 2 wherein Z is —NRQ further comprising the step of deprotecting the maleimide function by heating the polymer in a suitable solvent to about 180° to 200° C.
* * * * *